United States Patent [19]

Koechner

[11] Patent Number: 4,942,302
[45] Date of Patent: Jul. 17, 1990

[54] LARGE AREA SOLID STATE NUCLER DETECTOR WITH HIGH SPATIAL RESOLUTION

[75] Inventor: Walter Koechner, Great Falls, Va.

[73] Assignee: Fibertek, Inc., Herndon, Va.

[21] Appl. No.: 154,004

[22] Filed: Feb. 9, 1988

[51] Int. Cl.⁵ .......................... G01T 1/20; G01T 1/172
[52] U.S. Cl. .................................... 250/368; 250/366; 250/367
[58] Field of Search ............ 250/368, 367, 366, 390.11

[56] References Cited

U.S. PATENT DOCUMENTS

| | | | |
|---|---|---|---|
| 3,717,762 | 2/1973 | Grenier et al. | 250/336 |
| 3,965,353 | 6/1976 | Macovski | 250/366 |
| 4,180,736 | 12/1979 | Goodman | 250/390.11 |
| 4,280,125 | 7/1981 | Kazan | 250/368 |
| 4,437,002 | 3/1984 | Taniquchi et al. | 250/338.3 |
| 4,437,007 | 3/1984 | Koslow et al. | 250/367 |

FOREIGN PATENT DOCUMENTS

| | | | |
|---|---|---|---|
| 0076466 | 5/1982 | Japan | 250/368 |
| 0159675 | 8/1985 | Japan | 250/368 |
| 0207083 | 10/1985 | Japan | 250/368 |
| 8504959 | 11/1985 | PCT Int'l Appl. | 250/367 |

OTHER PUBLICATIONS

Binns et al. "A Scintillating Optical Fiber Track Imaging Detector" *Nuclear Instruments and Methods in Physics Research*, vol. 4251 (1986) pp. 402–406.

Primary Examiner—Constantine Hannaher
Attorney, Agent, or Firm—Herman J. Hohauser

[57] ABSTRACT

A large area nuclear detection system with high resolution includes a sensor formed of scintillating optical fibers and a remotely located detector comprising at least a pair of microchannel plate photomultiplier tubes, with the sensitive area of the sensor being many times the area of the detectors. Two linear arrays of optical fibers are arranged orthogonally to define a sensor matrix of rows and columns of fibers. Nuclear radiation from a particle at the sensor is converted to optical energy by the sensor. A microchannel PMT is connected with each array for measuring the optical energy output of the fibers thereof to determine the row and column location of the nuclear particle in accordance with the quantity of energy received from the fibers. Thus, nuclear radiation can be detected over a large area with a high degree of accuracy and resolution. A characterizing feature of the detection system is the conversion of the output of large orthogonally arranged layers of scintillator elements from a long and narrow rectangular format to a square or round output format to match the detector which typically has round or square sensitive areas of a few centimeters.

15 Claims, 3 Drawing Sheets

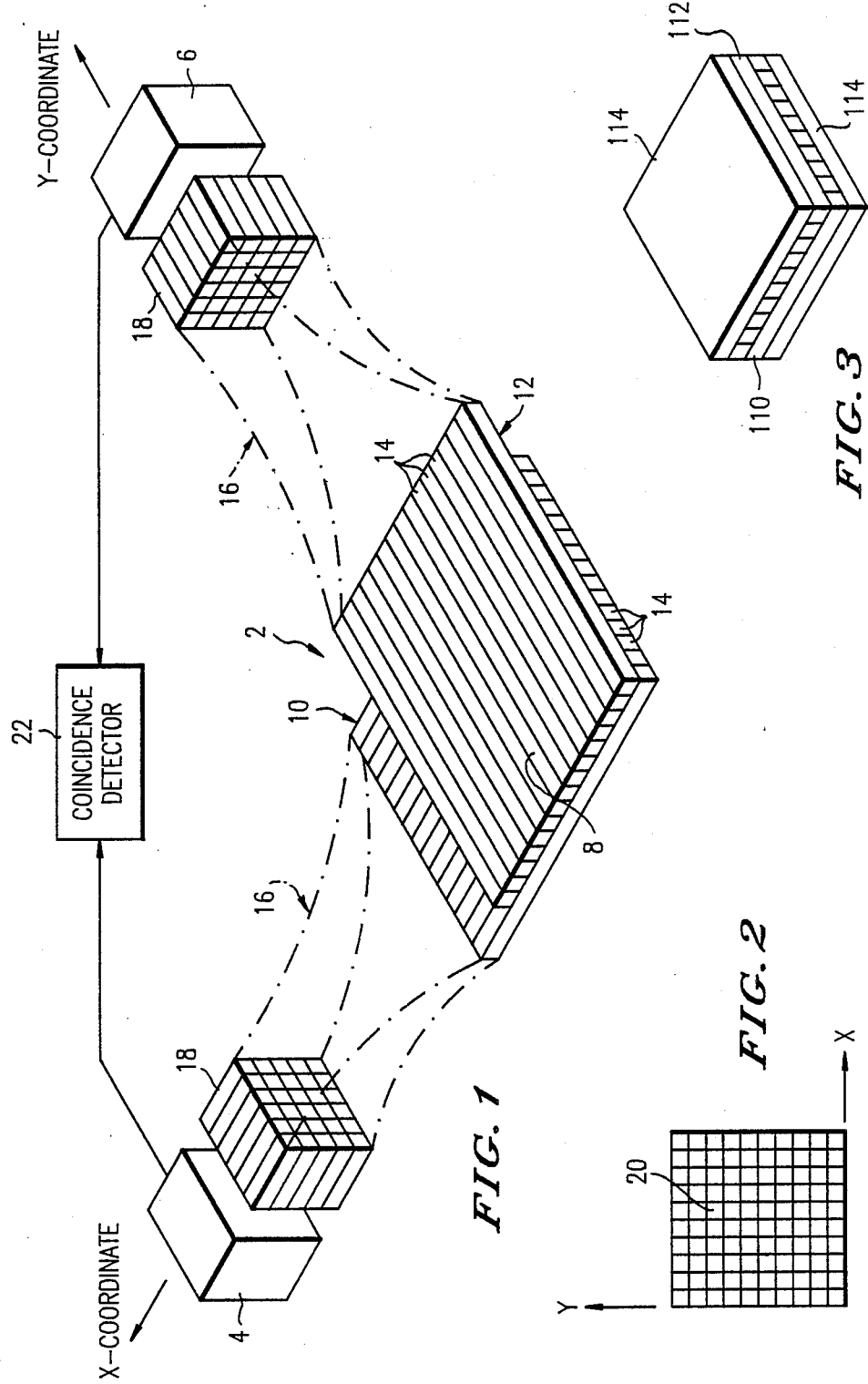

LARGE AREA SOLID STATE NUCLER DETECTOR WITH HIGH SPATIAL RESOLUTION

BACKGROUND OF THE INVENTION

In space astronomy, astrophysics, and atmospheric studies, it is desirable to detect and sense the position of nuclear particles and ionizing radiation. The present invention relates to a highly sensitive large area nuclear radiation detector which is based on scintillating optical fibers used as a particle sensor in combination with remotely located microchannel plate photomultiplier tubes connected with the fibers and used as the detectors. The novel particle detector design is characterized by a sensitive area which is many times that of a microchannel plate, whereby large area, two-dimensional, position sensitive particle detectors may be constructed using pre-existing microchannel plates. Accordingly, the present invention is suitable for use with satellites wherein the relatively small detector is arranged within the spacecraft and the larger sensor comprising an array of scintillator fibers is deployed a few hundred meters away for determining the trajectory of particles in space.

BRIEF DESCRIPTION OF THE PRIOR ART

Nuclear particle detectors based on scintillator element face plates mounted directly onto a microchannel photomultiplier tube (PMT) or onto a semiconductor radiation detector are known in the art. The face plate normally comprises a very large number of thin scintillation elements having a diameter less than fifty micrometers (50 $\mu$m). With these prior detectors, the aperture of the detection system is determined by the diameter of the photocathode of the microchannel plate PMT. A large area particle detector, therefore, requires development of large area microchannel plates.

While the prior devices normally operate satisfactorily, they are not suitable for large area detection since, as set forth above, large area microchannel plates would be required. These plates are prohibitively expensive and would not provide the requisite degree of resolution for accurate detection. Moreover, because the scintillator elements are connected directly with the detectors, no remote location of the sensor relative to the detectors is possible. The present invention was developed in order to overcome these and other drawbacks of the prior detectors by providing a particle detector having a collecting aperture or sensor which is one to two orders of magnitude larger than the area of the microchannel PMT's employed for the detection of the optical radiation. More particularly, the sensor is formed of scintillator fibers which comprise the sensitive elements. The fibers are arranged in an orthogonal matrix and allow the detector to be remotely located from the sensor since the scintillator fibers allow direct coupling to light transmitting fibers. The scintillator fibers also permit a change in geometry from the long and narrow scintillator array to a square or round output which matches the detector.

SUMMARY OF THE INVENTION

Accordingly, it is a primary object of the present invention to provide a large area nuclear radiation detector including a sensor which senses the presence of a nuclear particle and converts the nuclear radiation energy thereof to optical energy. The sensor is formed of first and second linear arrays of optical fibers formed of scintillator material. The fibers of each array have a square cross-sectional configuration and are arranged in parallel contiguous relation in a common plane. The arrays are arranged orthogonally to define a matrix of rows and columns of fibers. First and second detectors are connected with one end of the fibers of the first and second arrays, respectively, with the other ends of the fibers being coated with a reflective material to insure that all optical energy from the fibers is transmitted to the detectors. Each detector measures the optical energy output from the fibers of the associated array to determine the row and column location of the nuclear particle in accordance with the quantity of energy received from the fibers. The surface area of the sensor is many times greater than that of the detectors, whereby nuclear radiation can be detected over a large area with a high degree of accuracy and resolution.

According to a more specific object of the invention, the detectors each comprise a planar microchannel plate such as a photomultiplier tube, and the fibers of each array include a transition region between the sensor and the detector to convert the linear arrays to a planar configuration. Each channel of the microchannel PMT detector is connected with one optical fiber, and the detectors compare the optical energy from the fibers of the associated arrays to determine the particle location.

In accordance with another object of the invention, a coincidence circuit is connected with the detectors. The coincidence circuit insures that a valid indication of particle location is provided only when there has been detection by both of the detectors, thereby providing row and column location information.

It is yet another object of the invention to arrange two pairs of first and second orthogonal arrays of fibers in a parallel spaced relation to sense particle location and direction in three dimensions.

According to a further object of the invention, a plurality of pairs of first and second arrays are arranged in adjacent modules to increase the area of the sensor.

BRIEF DESCRIPTION OF THE FIGURES

Other objects and advantages of the subject invention will become apparent from a study of the following specification when viewed in the light of the accompanying drawing, in which:

FIG. 1 is a perspective diagrammatic view of the preferred embodiment of the large area nuclear particle detector according to the invention;

FIG. 2 is a graphical representation of the resolution of the particle position display obtained with the detector of FIG. 1;

FIGS. 3 and 4 are front perspective and top plan views, respectively, of an alternate embodiment of the invention employing a linear detection device;

DETAILED DESCRIPTION

Figure 5:
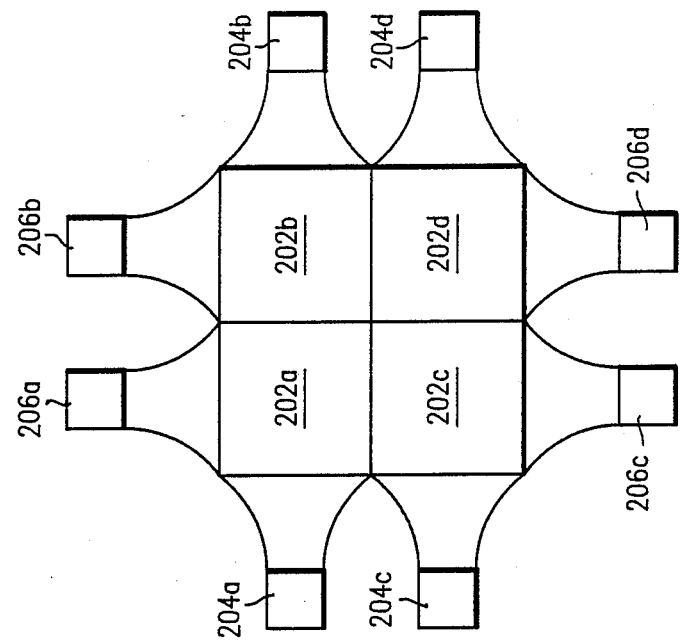
FIGS. 5 and 6 are top plan views of alternate modular sensor assemblies according to further alternate embodiments of the invention.

Referring first to FIG. 1, the preferred embodiment of the large area solid state nuclear detection system according to the invention is shown. The system comprises a sensor 2 and a pair of detectors 4, 6 for sensing and detecting the presence and location of a nuclear particle 8.

The sensor 2 comprises first 10 and second 12 linear arrays of optical fibers 14 formed of scintillator material. The fibers of each array are tightly packaged or bundled in contiguous relation, with the fibers of each array being contained in a common plane. The planar linear arrays of fibers are arranged in parallel, contiguous planes with the fibers of the second array 12 being arranged orthogonally relative to the fibers of the first array 10 as shown in FIG. 2. As will be developed below, the first and second arrays of fibers define a two-dimensional position sensor having a matrix of rows (i.e. the fibers of the first array 10 which extend in the direction of the x-coordinate) and columns (i.e. the fibers of the second array 12 which extend in the direction of the y-coordinate). Since the two fiber arrays are sandwiched together, they will be exposed to the same flux from the particle 8. The first and second fiber arrays receive the nuclear radiation from the particle and convert it to optical radiation or energy which is transmitted through the fibers of each array to the first and second detectors 4, 6 connected with the remote ends of the first and second arrays of fibers as will be developed in greater detail below.

Referring once again to the arrays of the sensor 2, each array preferably comprises 100 square optical fibers with a cross section of 1×1 mm and a length of 10 cm for the active area of the sensor, and an additional 10 to 20 cm for a transition area 16 from the flat array at the sensor to a square bundle 18 at the inputs to the detectors 4, 6. The transition area is required for aperture transformation to match the inputs to the detectors. A characterizing feature of the invention is the conversion of a linear array of scintillator fibers into a square output bundle. The bundle may be coupled to light transmitting fibers for propagation over long distances, thereby providing a remote location of the sensor elements relative to the detectors. The conversion of the linear arrays of fibers into a square output bundle is also suitable for matching to square or round detectors.

A gamma photon or neutron impinging on the first and second sandwiched arrays of fibers will generate optical radiation in two orthogonally oriented fibers 14. The visible radiation is transmitted to both ends of each fiber. As set forth above, one end of each fiber is connected with a detector 4, 6. The other end of the fiber, which defines an end edge of the sensor array, has a reflective coating (not shown) to increase the optical output of the fiber. The optical radiation measured by the detector elements of the two fibers will define the x and y coordinates of the location 20 of the particle impingement as shown in FIG. 2. A coincidence detector circuit 22 is connected with the detectors 4, 6 to insure coincidental arrival of optical pulses on the appropriate row and column fibers to validly register the spatial location of impingement. The spatial resolution of the location depiction (FIG. 2) is determined by the cross-section of the optical fibers. Although the preferred fibers are 1 mm² in cross section, having the shape of a square with 1 mm sides, a square cross section with sides ranging in length from 0.5 mm to 1.4 mm is acceptable.

In the preferred design, 100 square fibers, 1 mm in width, form a 10 cm wide ribbon or linear array. Overlying two such ribbons cross wise results in a sensor area of 100 cm² (i.e. a 10×10 array of 1 mm fibers) for each array. Since the resolution is determined by the diameter of the optical fibers, the 100 cm² sensor has 10,000 pixels or resolution elements.

The optical fibers 14 are preferably drawn from plastic scintillator material and cladded with a suitable material. More particularly, the scintillator fibers are based on polyvinyltoluene or styrene containing various amounts of organic scintillator materials, such as for example, 2, 5-diphenyloxazole (PP0). Most of these organic scintillators emit light in the UV range. For example, the maximum fluorescence peak of PPO is 363 nm. In order to reduce self-absorption of this short wavelength in the plastic scintillator and in order to better match the output wavelength to the sensitivity of photomultiplier tubes which are the preferred detectors as will be developed below, spectrum shifters are added to the solution. Commonly used spectral shifters include bis-MSB p-bis-(o-methylstyrylbenzene, dimethyl-POPOP and POPOP. These wavelength shifters absorb the UV light emitted from the primary scintillator material and shift it to longer wavelengths, typically into the 410–440 nm region. Recent developments of green and red emitting fluorescent materials may also be used for the scintillator material. The transition section may be formed from ordinary silica based fibers. However, employing the same scintillator fibers in the transition area as in the sensor area results in a simple and more straightforward design.

The fiber materials are cast in suitable forms during the polymerization process. A sleeve of polymethylmethacrylate is added which provides the optical cladding of the fiber. Since all these materials are thermoplastic, a fiber can be drawn by heating the fiber perform.

The detectors 4, 6 may be selected from a number of currently available devices for the detection of fluorescence in scintillator optical fibers. These include the microchannel photomultiplier tube (PMT), a discrete dynode PMT, an image dissector, an image intensifier, intensified self-scanned arrays, and the like.

The preferred detectors for the present invention are microchannel PMT's. Position information is obtained with the inventive detection system by comparing the output signals generated by individual fibers within an array. This makes the microchannel PMT particularly useful because up to 100 separate input and output channels are available from one single detector (ITT type F4149). This tube has a photocathode comprised of a 10×10 array of anodes. Each anode has a 1.7×1.7 mm area. With a special bialkali photocathode and operation close to 0° C., the dark count rate of the photomultiplier tube is only a few counts per second in each channel, which allows the measurement of extremely low light levels (single photon counting). The tube is 2" in diameter and 1" long and designed for operation in severe environments.

Another potential detector is a microchannel image intensifier tube, such as, for example ITT Model F4156, followed by a self-scanning silicon diode array as a read out device. This involves photoelectronic multiplication through several microchannel plates followed by acceleration to a phosphor screen and subsequent detection of the phosphorescence by a Reticon self-scanned photo diode array. It has been shown that it is quite practical to read a proximity-focused image intensifier having microchannel plates with a self scanned array and record single photo events. The important feature of this approach is off-the-shelf availability of the major components. Proximity focused microchannel intensifier tubes and self-scanned silicon diode arrays for the collection of the output are readily available, whereas microchannel PMT's are, at the current time, not manufactured in large quantities.

Figure 4:
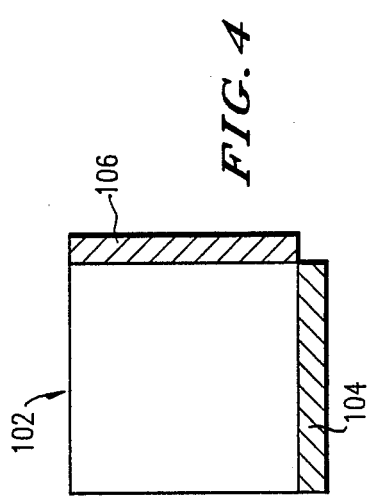

FIGS. 3 and 4 are front perspective and top views, respectively, of an alternate embodiment for the large area nuclear detection system wherein a transitional fiber area is not required. In this embodiment, two orthogonally arranged linear arrays 110, 112 are sandwiched between two metal plates 114 which are preferably made of aluminum. Connected directly with the edges of the sensor are the first and second detectors 104, 106 which comprise specially designed microchannel plate PMT's which match the long narrow aspect ratio of the scintillator fiber array, respectively.

Another potential detector for use in the embodiment of FIGS. 3 and 4, although not as sensitive as a microchannel plate, is a multi-element silicon array detector. For example, Hamamatsu Model S1592-01 is a 35-element UV enhanced linear array detector. Each pixel size is about 1×4 mm, and total array size is 35 mm×4 mm. Similar array detectors are also available from EG&G and United Detector Technology. These detector arrays, which are extensively used in multichannel spectrophotometers, can be directly matched with the fiber arrays 112, 114.

In all of the detector approaches discussed above, each scintillation fiber is terminated by one individual detector element. The signal obtained from each detector element is amplified, passes through a thresholding device and is converted into a digital signal for a coincidence check and storage. A microprocessor (not shown) constantly reads the outputs from all detector channels and displays the coordinates of an event on a screen as in FIG. 2 or prints out data in tabular form with a very high degree of resolution.

In accordance with a characterizing feature of the invention, the sensor has a surface area many times greater than the surface area of the detectors. In the embodiment of FIG. 1 for example, the sensor with a surface area of 100 cm² has a resolution of 1 mm² while the first and second detectors 4, 6 (microchannel PMT's) each have an area of only 1 cm² (10×10 array/1 mm diameter). These values are based on a resolution requirement of 1 mm² and two linear scintillator fiber arrays of 100 fibers each.

Figure 6:
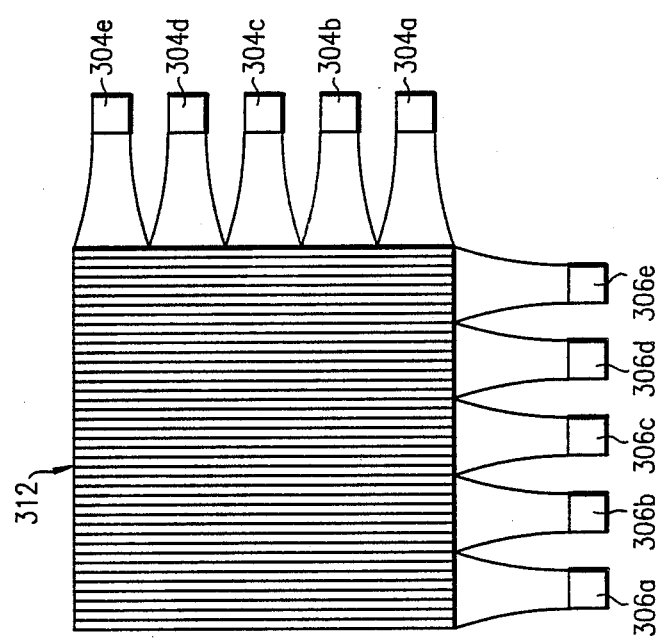

Considering each such sensor array as a module, very large sensors may be constructed as shown in FIGS. 5 and 6 by arranging a plurality of modules adjacent one another. For example, in FIG. 5, four modular sensors 202a, 202b, 202c, and 202d, each having their own transition regions (not shown) and corresponding first and second detectors 204a–d, respectively, are arranged in a square to define a sensor area four times greater than that of the sensor 2 of FIG. 1. In FIG. 6 is shown an enlarged sensor wherein a plurality (i.e. five) of first and second 312 arrays are grouped adjacent one another in modular fashion, with each array being connected with its associated detector 304a–e, 306a–e.

Using 1 mm square fibers and a microchannel plate (MCP) PMT having a 10×10 array 1 mm² pixel size, the following detection system parameters are obtained:

| Detector area (cm²) | Number of MCP PMT's | Number of fibers in Array |
| --- | --- | --- |
| 100 | 2 | 100 |
| 400 | 8 | 400 |
| 10,000 | 20 | 1000 |

Figure 7:
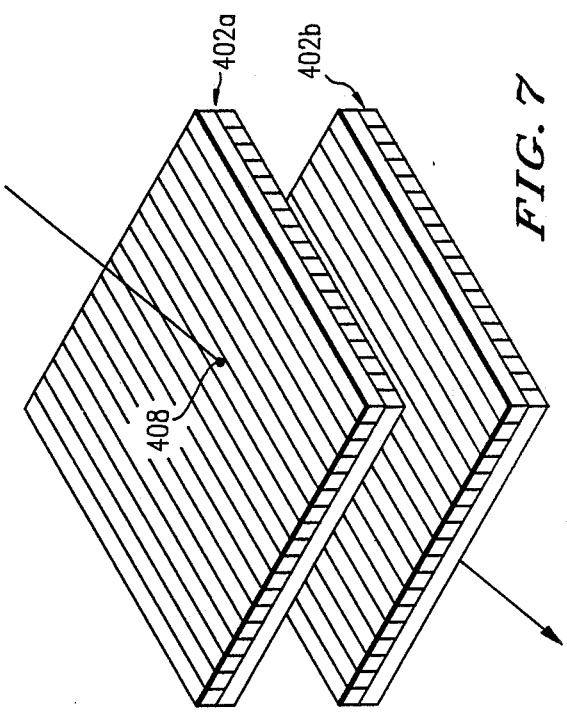
FIG. 7 is a front perspective view of a first sensor configuration for detecting nuclear particle position and direction in three dimensions.
Figure 8:
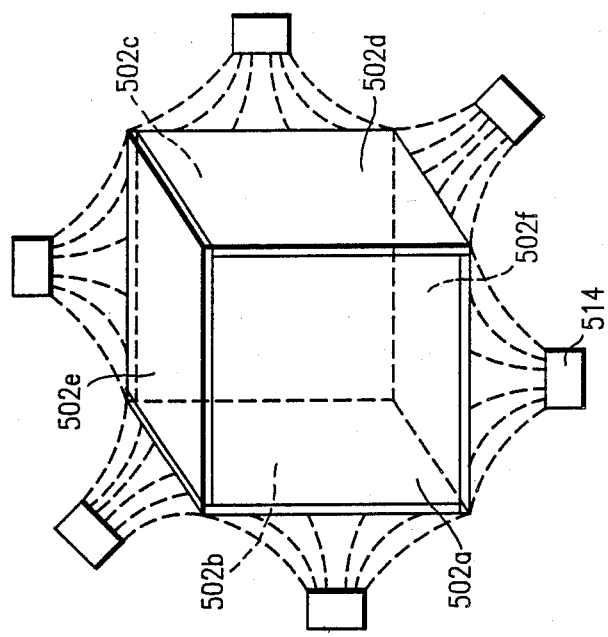
FIG. 8 is a front perspective view of a second sensor configuration comprising orthogonal pairs of linear fiber arrays each defining the side of a cube for detecting particle position and direction in three dimensions.

Three dimensional sensors are also possible as shown in FIGS. 7 and 8. In FIG. 7, a pair 402a, 402b of sandwiched sensors are provided in spaced parallel relation. Each sandwiched sensor comprises contiguous orthogonally arranged first and second linear arrays of fibers. By spacing the sandwiched arrays, the trajectory of a particle 408 entering the front face 402a of the three-dimensionsal sensor can be determined.

In the embodiment of FIG. 8, six sandwiched sensors 502a, 502b, 502c, 502d, 502e, and 502f are spatially arranged in a cubical configuration. As before, each sensor comprises contiguous orthogonally arranged first and second linear arrays of fibers, with each sensor being connected with a first detector (not shown) and a second detector (not shown) connected with the first and second arrays, respectively, of each sensor. The cubical sensor may be used as an omnidirectional particle detector.

The large area solid state nuclear particle detector of the present invention is thus characterized by the use of scintillator fibers in orthogonal arrays as the sensing elements which are remotely located from and which have a much greater surface area than the detectors. The output of the large orthogonally arranged layers of scintillator fibers is converted from a long and narrow rectangular format to a square or round output format because detectors such as photomulitipliers or solid state sensors cannot be built as long narrow structures but usually have round or square sensitive areas of a few centimeters.

While in accordance with the provisions of the patent statutes the preferred forms and embodiments of the invention have been illustrated and described, it will be apparent to those of ordinary skill in the art that various changes and modifications may be made without deviating from the inventive concepts set forth above.

What is claimed is:

1. A nuclear radiation detector system comprising:
  a first set of optical fibers;
  a second set of optical fibers;
  a first predetermined section of each of said fibers in said first set arranged side by side in a common plane to form a first linear array;
  a first predetermined section of each of said fibers in said second set arranged side-by-side in a common plane to form a second linear array;
  said first and second linear arrays being arranged orthogonally to define a matrix of rows and columns of fibers for sensing the presence of a nuclear particle and converting the nuclear radiation energy thereof to optical energy;
  a second predetermined section of each of said fibers in said first set arranged in a bundle to form a first planar array wherein an open end of each of said fibers from an end surface of said first planar array to provide an output for optical energy generated in said first set of optical fibers;

a second predetermined section of each of said fibers in said second set arranged in a bundle to form a second planar array wherein an open end of each of said fibers form an end surface of said second planar array to provide an output for optical energy generated in said second set of optical fibers; and;

detector means coupled to said first and second planar arrays for measuring the optical energy output thereof to determine the location of the sensed nuclear particle.

2. The nuclear radiation detector system of claim 1, wherein each of said fibers in said first and second sets are formed of scintillator material.

3. The nuclear radiation detector system of claim 2, wherein each of the fibers of said first set of fibers have closed ends that form the edge of the first linear array.

4. The nuclear radiation detector system of claim 3, wherein the surface area defined by said first and second linear arrays is greater than the surface area formed by the first and second planar arrays respectively.

5. Apparatus as defined in claim 1, and further comprising coincidence circuit means connected with said detector means for sensing a reading to register particle presence.

6. Apparatus as defined in claim 5, wherein all of said optical fibers have a square cross-sectional configuration.

7. Apparatus as defined in claim 6, wherein the length of the sides of said square cross-sectional configuration is between 0.5 mm to 1.4 mm.

8. Apparatus as defined in claim 5, wherein said detector means includes a plurality of detector elements each connected with one optical fiber for measuring the optical energy therefrom.

9. Apparatus as defined in claim 8, wherein detector means includes means for converting the measured optical energy into digital data.

10. Apparatus as defined in claim 5, wherein said detector means comprises a microchannel plate, each channel thereof being connected with one optical fiber, respectively, said detector means comparing the optical energy from said fibers to determine the particle location in accordance with the strength of optical energy from said fibers.

11. Apparatus as defined in claim 10, wherein each of said microchannel plates comprises a photomultiplier tube.

12. Apparatus as defined in claim 11, wherein said first and second linear arrays are arranged in a contiguous sandwiched relation to define sensor means for sensing particle location in two dimensions.

13. Apparatus as defined in claim 12, wherein a plurality of contiguous pairs of first and second linear arrays are arranged in adjacent modules to increase the area of said sensor means.

14. Apparatus as defined in claim 12, wherein a pair of contiguous first and second linear arrays are arranged in spaced parallel relation to define sensor means for sensing particle location and direction in three dimensions.

15. Apparatus as defined in claim 5, wherein six sets of said first and second linear arrays are spatially arranged to define the walls of a cube, each of said sets comprising first and second orthogonal linear arrays of fibers connected with first and second detectors, respectively, whereby omnidirectional particle location and direction is detected.

* * * * *